United States Patent [19]
Garbacik

[11] Patent Number: 6,095,702
[45] Date of Patent: Aug. 1, 2000

[54] KEYBOARD DUST COVER

[76] Inventor: Jeremy J. Garbacik, 52 Regents, Troy, Mich. 48084

[21] Appl. No.: 09/311,337

[22] Filed: May 13, 1999

[51] Int. Cl.[7] ..................................... B41J 29/13
[52] U.S. Cl. ..................... 400/496; 400/714; 312/208.3
[58] Field of Search ..................... 400/496, 693, 400/694, 714; 312/208.3; 150/165

[56] References Cited

U.S. PATENT DOCUMENTS

| | | | |
|---|---|---|---|
| 203,414 | 5/1878 | Buckley et al. | 160/292 |
| 2,140,049 | 12/1938 | Grauel | 160/121.1 |
| 4,786,120 | 11/1988 | Sparks et al. | 312/208.3 |
| 4,922,980 | 5/1990 | Parker | 150/165 |
| 5,175,386 | 12/1992 | Kuwahara | 84/175 |
| 5,184,660 | 2/1993 | Jelic | 166/171 |
| 5,361,822 | 11/1994 | Nijs | 160/321 |
| 5,370,468 | 12/1994 | Chern et al. | 400/713 |
| 5,374,018 | 12/1994 | Daneshvar | 248/118 |
| 5,482,105 | 1/1996 | Rude | 160/307 |
| 5,499,793 | 3/1996 | Salansky | 400/718 |
| 5,551,497 | 9/1996 | Stanley | 5/154 |
| 5,944,432 | 8/1999 | Richardson | 400/713 |

*Primary Examiner*—John S. Hilten
*Assistant Examiner*—Daniel J. Colilla
*Attorney, Agent, or Firm*—Brinks Hofer Gilson & Lione

[57] ABSTRACT

In combination with a keyboard, a keyboard dust cover comprising a housing containing a spring-loaded roller, the housing being attached to a first wall of the keyboard, a sheet having a first edge attached to the roller, and a mechanism for securing the sheet in an extended position over the keyboard. Also, a keyboard dust cover comprising a housing containing a spring-loaded roller, a sheet having a first edge attached to the roller, and a mechanism for securing the sheet in an extended position over a keyboard.

27 Claims, 1 Drawing Sheet

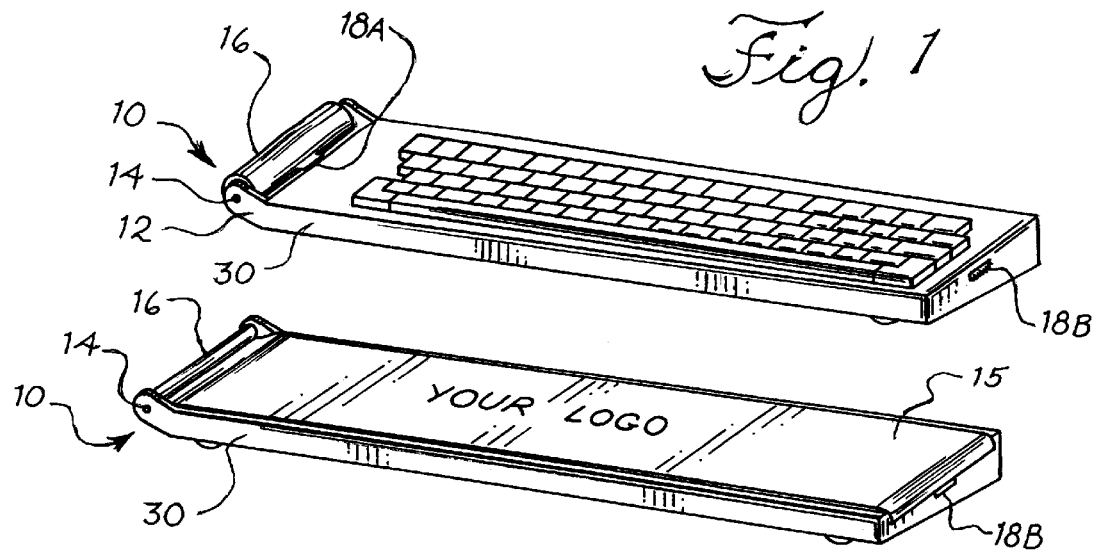
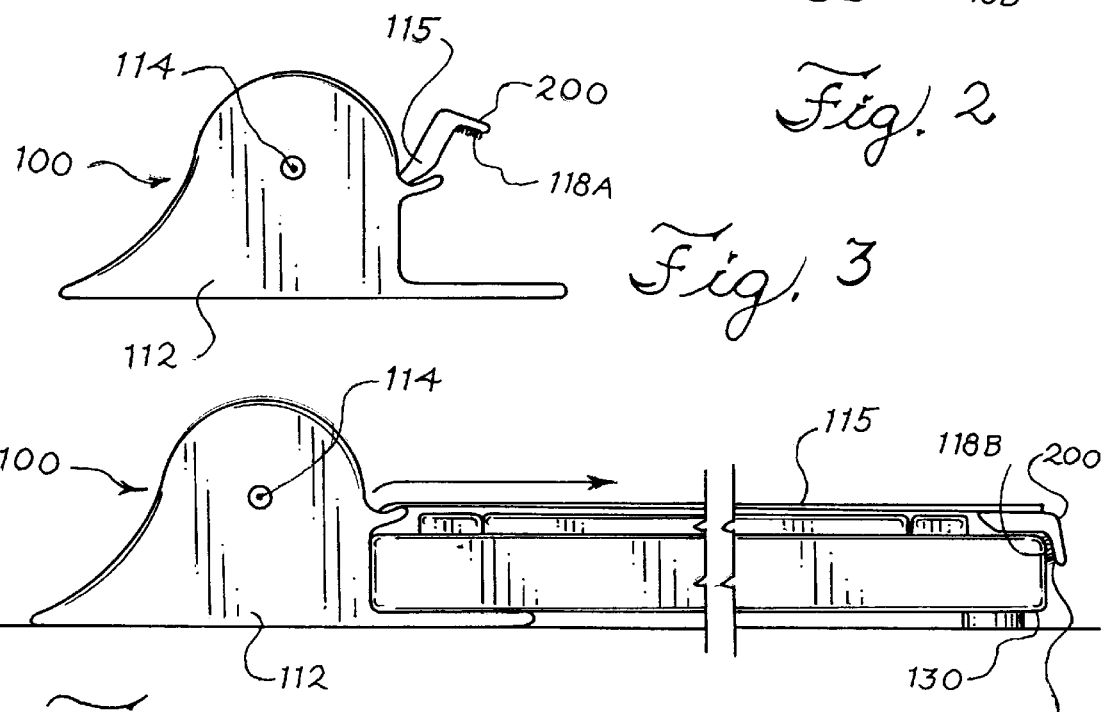
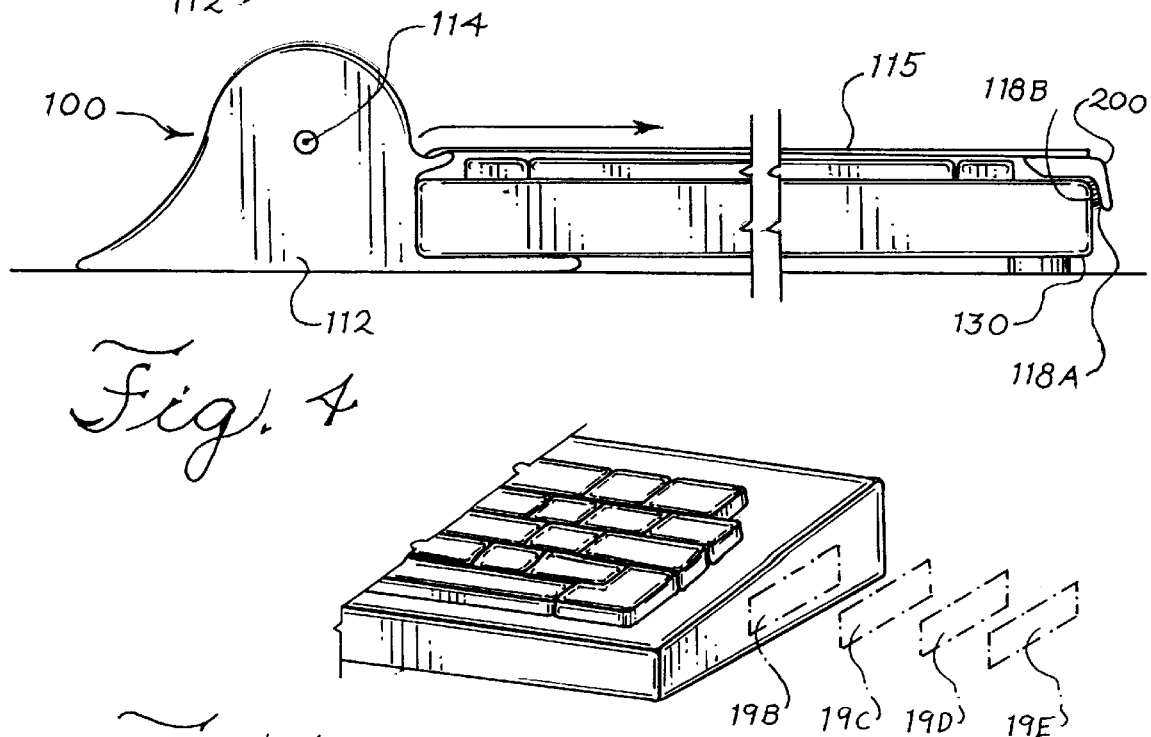

KEYBOARD DUST COVER

BACKGROUND

This invention pertains to a novel keyboard dust cover.

Known keyboard dust covers include hard plastic lids that have to be placed over a keyboard when the keyboard is not in use. See, for example, U.S. Pat. No. 4,786,120. This type of dust cover must be taken off of the keyboard and placed in storage when the keyboard is in use. Then, when the keyboard is no longer in use, the keyboard dust cover must be taken from storage and placed over the keyboard. As a result, these dust covers are not convenient to use.

Other known keyboard dust covers, such as the ones disclosed in U.S. Pat. No. 4,922,980, are restricted to elastomeric sheets. These elastomeric sheets rest directly on a debris and dust-collecting surface, such as a desktop upon which a keyboard sits. These dust covers get dirty from their positioning, and they take up space on the desktop.

Therefore, what is needed is an attractive, convenient keyboard dust cover that saves space while protecting the keyboard from dust and debris.

SUMMARY

The present invention provides an attractive, convenient keyboard dust cover that saves space while protecting the keyboard from dust and debris. In addition, the keyboard dust cover of the present invention is inexpensive to manufacture and easy to use. This keyboard dust cover is preferably used with computer keyboards, but can be used with musical instrument keyboards and other types of keyboards.

One embodiment comprises a keyboard dust cover in combination with a keyboard. The keyboard dust cover comprises a housing containing a spring-loaded roller. The housing is attached to a first wall of the keyboard. A sheet having a first edge attached to the roller acts as device that covers the keyboard. The keyboard dust cover and keyboard combination also includes a mechanism for securing the sheet in an extended position over the keyboard.

In another embodiment, the combination of a keyboard and a keyboard dust cover comprises a housing containing a spring-loaded roller, the housing being attached to a first wall of the keyboard. It further comprises a sheet having a first edge attached to the spring-loaded roller, and the spring-loaded roller having a holding assembly that releasably holds the sheet in an extended position.

In still another embodiment, the keyboard dust cover is not attached to the keyboard, and it is therefore not in combination with a keyboard.

In another embodiment, the sheet in the keyboard dust cover is made of a material suitable for printing a mark such as a photograph, a picture, an icon, a logo, a trade mark, a service mark, a cartoon character or scene, or other artwork. Preferably, the spring-loaded roller to which the sheet is attached can easily be removed from the housing and replaced with another. This way, various companies wanting to sell keyboard dust covers with their logo can do so, and the purchasers of those keyboard dust covers can easily replace one spring-loaded roller with another.

BRIEF DESCRIPTION OF THE DRAWINGS

FIG. 1 shows a perspective view of a keyboard dust cover in combination with a keyboard.

FIG. 1a is cut-away view of the keyboard of FIG. 1 with a symbolically represented fastener.

FIG. 2 shows a perspective view of the keyboard dust cover of FIG. 1 in an extended position over a keyboard.

FIG. 3 shows a side view of a keyboard dust cover.

FIG. 4 shows a side view of the keyboard dust cover of FIG. 3 in an extended position over a keyboard.

DETAILED DESCRIPTION OF THE PREFERRED EMBODIMENTS

Referring to FIGS. 1 and 2, a keyboard dust cover 10 is shown in combination with a keyboard 30. In this embodiment, a housing 12 has an aperture 14 into which an end of a spring-loaded roller 16 fits. The housing 12 is molded to a side wall of the keyboard 30 during a manufacturing process of the keyboard 30. A sheet 15 has a first edge attached to the spring-loaded roller 16. FIG. 1 shows the sheet 15 in a rolled position, and FIG. 2 shows the sheet 15 in an extended position. FIGS. 1 and 2 also show a mechanism for securing the sheet in an extended position comprising members 18A and 18B, which are complementary components of a hook and loop fastener such as VELCRO.

The housing 12 depicted in FIGS. 1 and 2 is intended to be exemplary rather than limiting. It is preferably made of a hard plastic, but can conceivably be made of different materials known in the art. The housing 12 can be used to the support spring-loaded roller 16 on the keyboard 30, and it can cover more surface area of the spring-loaded roller 16, thereby protecting the spring-loaded roller 16 from dust and debris.

The housing 12 can also comprise more than one part, where one or more parts function to support the spring-loaded roller 16 on the keyboard 30, and one or more parts function to protectively cover the spring-loaded roller 16. In one example, hard plastic support members are accompanied by a removeable, soft, flexible plastic, vinyl, polyester, or cotton cover member that wraps around the spring-loaded roller 16 and the sheet 15, the cover member remaining substantially stationary when the sheet 15 is moved between its rolled position and its extended position. The cover member is preferably clipped or otherwise attached onto the housing 12 to hold the cover member steady while the sheet 15 is moved between its rolled position and its extended position.

In FIGS. 1 and 2, the housing 12 has the aperture 14 into which the spring-loaded roller 16 fits. With this arrangement, the spring-loaded roller 16 is removeably mounted to the housing 12. In an alternative embodiment, the housing 12 has an open-ended slot into which spring-loaded roller fits. In another embodiment, a shoulder on the housing 12 supports spring-loaded roller 16. The mechanism by which the housing 12 supports the spring-loaded roller 16 is broad enough to encompass any mounting mechanism known in the art, preferably removable mounting mechanisms.

In FIGS. 1 and 2, the housing 12 is attached to a first wall of the keyboard 30, which happens to be a side wall of the keyboard 30. In an alternative embodiment, the housing 12 is attached to another side wall or to a back wall of the keyboard 30.

In FIGS. 1 and 2, the housing 12 is attached to the keyboard 30 by having been molded into the keyboard 30 during the manufacturing process of the keyboard 30. In an alternative embodiment, the housing 12 is adhesively secured to the keyboard 30. In another embodiment, housing 12 is attached to the keyboard 30 by at least mechanical fastener such as a nail, a screw, a bolt, or a clip. In still another embodiment, the housing 12 can also be attached to the keyboard 30 with a hook and loop fastener such as VELCRO.

In FIGS. 1 and 2, the spring-loaded roller 16 biases the sheet 15 into its rolled position. The spring-loaded roller 16 is preferably adjustable in length so that it can more easily fit into the housing 12. Spring-loaded rollers are well known in the art, and the scope of this invention is intended to cover a broad range of spring-loaded rollers. For example, in one preferred embodiment, the spring-loaded roller 16 includes a holding assembly that releasably holds the sheet in an extended position. In another embodiment, the holding assembly comprises a ratchet and pawl mechanism (fully disclosed in U.S. Pat. Nos. 203,414 and 2,140,049, which are hereby incorporated by reference) for holding the sheet 15 in the extended position. In another embodiment, the holding assembly comprises a friction brake mechanism (fully disclosed in U.S. Pat. Nos. 5,184,660 and 5,482,105, which are hereby incorporated by reference) for holding the sheet 15 in the extended position. In still another embodiment, a clutch mechanism (fully disclosed in U.S. Pat. Nos. 4,337,432 and 5,361,822, which are hereby incorporated by reference) is used to hold sheet 15 in the extended position.

In FIGS. 1 and 2, the sheet 15 is shown. The sheet 15 is square or rectangular or another shape that aptly covers today's ergonomically-shaped keyboards. The sheet 15 has a first edge attached to the spring-loaded roller 16. The sheet 15 can be attached adhesively, through stitching, through mechanical fasteners such as staples, nails, and screws, or through any other mechanism known in the art.

The sheet 15 is preferably an elastomeric material having good flexibility qualities so that it can roll around the spring-loaded roller 16 and extend over the keyboard 30. The sheet 15 can also comprise a material selected from the group consisting of polyester, vinyl, nylon, and cotton, and blends thereof. It is preferable that the sheet 15 be made of a material suitable for printing a mark such as a photograph, a picture, an icon, a logo, a trade mark, a service mark, a cartoon character or scene, or other artwork. The sheet 15 preferably has a tab on one end, opposite the edge attached to the spring-loaded roller 16. The tab makes the sheet 15 more easily moveable between its rolled and extended positions.

In FIGS. 1a and 2, a hook and loop fastener 18A and 18B is the mechanism for securing the sheet 15 into the extended position. Alternatively, a mechanism for securing the sheet 15 into the extended position comprises the sheet 15 having an elastomeric strip 19B at one end, opposite the edge attached to the spring-loaded roller 16. This elastomeric strip 19B can be configured to fit around a wall of the keyboard 30 opposite the wall where the housing 12 is attached to the keyboard 30. Alternatively, the mechanism for securing the sheet 15 in the extended position comprises a fastener selected from the group consisting of a hook and loop fastener, a clip 19C, a snap 19D, a molded plastic fastener, and a button 19E.

Referring to FIGS. 3 and 4, a keyboard dust cover 100 is shown. The keyboard dust cover 100 is not attached to a keyboard 130. The keyboard dust cover 100 comprises a housing 112 containing an aperture 114 into which a spring-loaded roller (not visible from the side view) fits. A sheet 115 is attached to the spring-loaded roller so that when a tab 200 is pulled, the sheet 115 moves from a rolled position depicted in FIG. 3 to an extended position depicted in FIG. 4. Hook and loop fastener 118A and 118B hold the sheet 115 in the extended position.

The housing 112 in FIGS. 3 and 4 lies flat on a surface and is not attached to the keyboard 130. Although a perspective view of the embodiment depicted in FIGS. 3 and 4 is not shown, this embodiment's housing 112 has a hard plastic cover that extends the length of a side wall of the keyboard 130, and it has an opening large enough so that the spring-loaded roller 116 can be removeably mounted therein.

The embodiment depicted in FIGS. 3 and 4 has all the same variations for the embodiment depicted in FIGS. 1 and 2, except for mechanisms for attaching housings 12 and 112 to keyboards 30 and 130, respectively.

While the above description contains many specific details, these details should not be construed as limitations on the scope of the invention, but rather as an exemplification of particular embodiments depicted in FIGS. 1, 1a, 2, 3, and 4 Accordingly, the scope of the invention should be determined not by the embodiments illustrated in FIGS. 1, 1a, 2, 3, and 4, but by the appended claims and their legal equivalents.

What is claimed:

1. In combination with a keyboard, a keyboard dust cover comprising:
    a housing containing a spring-loaded roller that is removably mounted to the housing with a removable mounting mechanism such that the roller is removable from the housing without disassembly of the housing, the housing being attached to a first wall of the keyboard,
    a sheet having a first edge attached to the roller, and
    a mechanism for securing the sheet in an extended position over the keyboard.

2. The combination of claim 1 wherein the housing is molded to the first wall of the keyboard.

3. The combination of claim 1 wherein the housing is adhesively secured to the first wall of the keyboard.

4. The combination of claim 1 wherein the housing is attached to the first wall of the keyboard by at least one mechanical fastener.

5. The combination of claim 1 wherein the housing is attached to the first wall of the keyboard with a hook and loop fastener.

6. The combination of claim 1 wherein the sheet comprises an elastomeric material.

7. The combination of claim 1 wherein the sheet comprises a material selected from the group consisting of polyester, vinyl, nylon, and cotton, and blends thereof.

8. The combination of claim 1 wherein the mechanism for securing the sheet comprises an elastomeric band at a second edge of the sheet opposite the first edge, the elastomeric band configured to hold the second edge of the sheet around a second wall of the keyboard, the second wall being opposite the first wall.

9. The combination of claim 1 wherein the mechanism for securing the sheet comprises a fastener selected from the group consisting of a hook and loop fastener, a clip, a snap, and a button.

10. A keyboard dust cover comprising:
    a housing containing a spring-loaded roller, wherein the spring-loaded roller is removably mounted to the housing with a removable mounting mechanism such that the roller is removable from the housing without disassembly of the housing,
    a sheet having a first edge attached to the roller, and
    a mechanism for securing the sheet in an extended position over a keyboard.

11. The keyboard dust cover of claim 10 wherein the sheet comprises an elastomeric material.

12. The keyboard dust cover of claim 10 wherein the sheet comprises a material selected from the group consisting of polyester, vinyl, nylon, and cotton, and blends thereof.

13. The keyboard dust cover of claim 10 wherein the mechanism for securing the sheet comprises an elastomeric band at a second edge of the sheet opposite the first edge, the elastomeric band configured to hold the second edge of the sheet around a wall of a keyboard.

14. The keyboard dust cover of claim 10 wherein the mechanism for securing the sheet comprises a fastener selected from the group consisting of a mechanical fastener, a hook and loop fastener, a clip, a snap, and a button.

15. In combination with a keyboard, a keyboard dust cover comprising:
a housing containing a spring-loaded roller wherein the spring-loaded roller is removably mounted to the housing with a removable mounting mechanism such that the roller is removable from the housing without disassembly of the housing, the housing being attached to a first wall of the keyboard,
a sheet having a first edge attached to the spring-loaded roller, and
the spring-loaded roller having a holding assembly that releaseably holds the sheet in an extended position.

16. The combination of claim 15 wherein the housing is molded to the first wall of the keyboard.

17. The combination of claim 15 wherein the housing is adhesively secured to the first wall of the keyboard.

18. The combination of claim 15 wherein the housing is attached to the first wall of the keyboard by at least one mechanical fastener.

19. The combination of claim 15 wherein the housing is attached to the first wall of the keyboard with a hook and loop fastener.

20. The combination of claim 15 wherein the sheet comprises an elastomeric material.

21. The combination of claim 15 wherein the sheet comprises a material selected from the group consisting of polyester, vinyl, nylon, and cotton, and blends thereof.

22. The combination of claim 15 wherein the holding assembly is selected from the group consisting of a ratchet and pawl mechanism, a friction brake mechanism, and a clutch mechanism.

23. A keyboard dust cover comprising:
a housing containing a spring-loaded roller wherein the spring-loaded roller is removably mounted to the housing with a removable mounting mechanism such that the roller is removable from the housing without disassembly of the housing,
a sheet having a first edge attached to the spring-loaded roller, and
the spring-loaded roller having a holding assembly that releaseably holds the sheet in an extended position.

24. The keyboard dust cover of claim 23 wherein the sheet comprises an elastomeric material.

25. The keyboard dust cover of claim 23 wherein the sheet comprises a material selected from the group consisting of polyester, vinyl, nylon, and cotton, and blends thereof.

26. The keyboard dust cover of claim 23 wherein the holding assembly is selected from the group consisting of a ratchet and pawl mechanism, a friction brake mechanism, and a clutch mechanism.

27. In combination with a keyboard, a keyboard dust cover comprising:
a housing containing a spring-loaded roller that is removably mounted to the housing with a removable mounting mechanism such that the roller is removable from the housing without disassembly of the housing, the housing being adjacent to a first wall of the keyboard;
a sheet having a first edge attached to the roller; and
a mechanism for securing the sheet in an extended position over the keyboard.

* * * * *